June 1, 1954  S. WASSERKRUG  2,679,767

ACCELERATOR PEDAL ATTACHMENT

Filed May 6, 1952

INVENTOR.
SAMUEL WASSERKRUG
BY
*Fred K. J. Sharon*
ATTORNEY.

Patented June 1, 1954

2,679,767

UNITED STATES PATENT OFFICE 2,679,767

ACCELERATOR PEDAL ATTACHMENT

Samuel Wasserkrug, St. Louis, Mo.

Application May 6, 1952, Serial No. 286,291

2 Claims. (Cl. 74—526)

The present invention pertains to an accelerator pedal attachment of a type particularly adapted for use as a speed meter in connection with the accelerator pedal of an automobile to keep the driver posted as to when a predetermined maximum speed has been reached without having to read the speedometer.

The primary object of the present invention is to provide a clamp for detachable connection with the accelerator pedal of an automobile, a holder or retainer adapted to be detachably connected with the clamp, and an automobile floor engaging member adapted to be detachably carried by the holder, or retainer.

Another object of the invention is to provide a device of the character wherein the holder, or retainer carrying the floor engaging element may be connected to the clamp from opposite ends thereof.

Another object of the invention is to provide a floor engaging member which is flexibly resilient such, for instance as rubber, and wherein one type of such member has a portion of one corner cutaway to render the portion more flexible than the remaining corners.

A further object of the invention is to provide a device which is applicable to either a pleasure car, or truck.

Other objects and advantages of the invention will readily suggest themselves and be apparent during the course of the following description.

The invention consists in the novel features of construction, arrangement and combination of parts as hereinafter described and finally pointed out in the appended claims.

In the accompanying drawings, forming a part of this application, and in which like numerals of reference are employed to designate like parts throughout the same:

Figure 1:
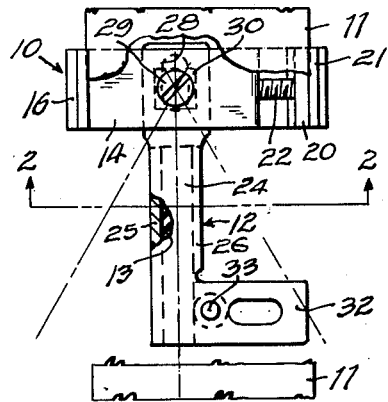
Fig. 1 is a top view of an accelerator pedal attachment embodying the features of my invention.
Figure 2:
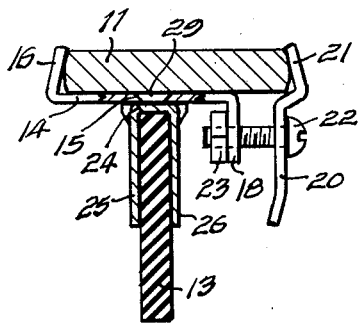
Fig. 2 is a cross-sectional view taken on line 2—2 of Fig. 1.
Figure 3:
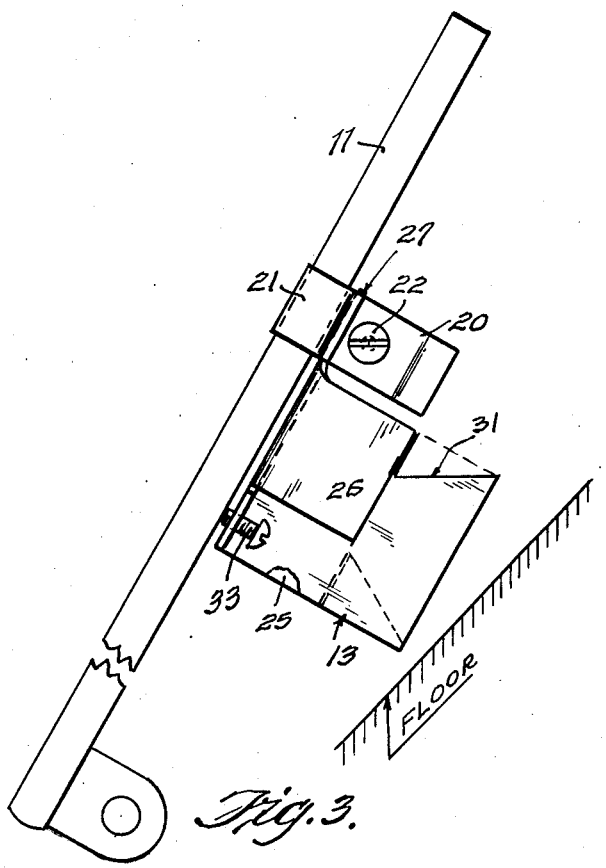
Fig. 3 is a side elevation of the device.
Figure 4:
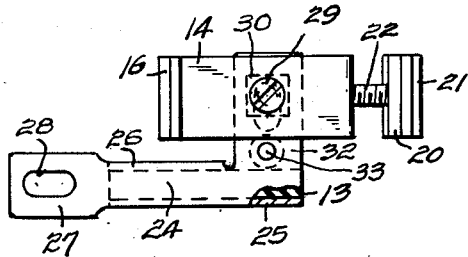
Fig. 4 is a top view of the device showing the holder for the floor engaging member connected to the pedal clamp from the opposite end to that shown in Fig. 1, and as used for trucks.
Figure 5:
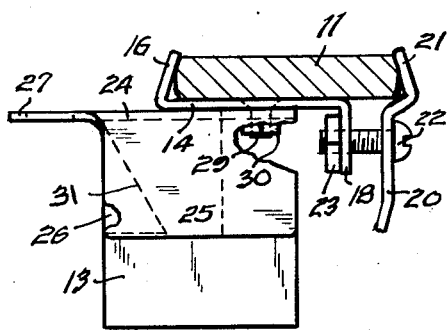
Fig. 5 is a rear elevation of Fig. 4.

In the drawings, wherein for the purpose of illustration, is shown a preferred embodiment of my invention, the numeral 10 designates, generally, a clamp adapted to be detachably connected to an automobile accelerator pedal 11; the numeral 12 designates, generally, a holder, or retainer preferably inverted U-shaped in end view; and, the numeral 13 designates, generally, a floor engaging member, preferably flexibly resilient such, for instance, as a piece of suitable flat rubber material.

The pedal clamp includes a flat strap-like body member 14 having a fastening opening 15 and having one end bent upwardly in an inclined direction to provide a pedal engaging dog, or flange 16, and having its opposite end bent downwardly to form a flange 17 having a fastener opening 18. The clamp further includes a strap member 19 having an opening 20 and having its upper end bent upwardly in an inclined direction to provide a pedal engaging dog, or flange 21. The pedal 11 rests on the clamp 10 and dogs 16 and 21 are forced to grip the side edges of the pedal 11 by a fastening device 22 which passes through the openings 18 and 20 and held against displacement by a nut 23.

The holder, or retainer 12 is preferably U-shaped and includes a top plate portion 24, and the opposed side wings, or walls 25 and 26 which are bent downwardly from the edges of the top plate portion. The right hand wing 26 is of less area than wing 25, but projects downwardly the same distance from the top plate portion 24. The top plate portion is provided with a forwardly projecting clamp supporting portion 27 having an opening 28 to receive a fastening device 29 which passes through the opening 15 in the strap portion 14, and which fastening device is provided with a nut 30 for detachably securing the holder, or retainer 12 to the underface of the clamp strap body member 14.

The floor engaging member 13 is substantially square in side elevation, and is of a thickness to frictionally fit the U-shaped holder, or retainer 12 with a substantial portion of the lower part of the member 13 projecting below the lower edges of the wings, or walls 25 and 26 after a predetermined amount of foot pressure on the accelerator pedal. The predetermined foot pressure on the pedal will not bend or flex the rubber floor engaging member 13, but surplus foot pressure will. A part of the forward lower corner portion of the floor engaging member 13 is cutaway, as at 31 to provide an angular cutaway section, thus rendering the forward lower end of floor engaging member 13 more flexible than the rear lower end, or corner portion of the floor engaging member 13.

When the device is to be used on a truck, the floor engaging member 13 is applied to the holder in an inverted position to provide a stiffer lower exposed end portion. Also, when used on a truck, the holder, or retainer 12 is connected to the clamp body portion 14 by an apertured ear 32 which projects laterally from the rear end of the holder, or retainer 12. Thus, when the device is attached to the accelerator pedal of a truck, it lies transversely with relation to the longitudinal axis of the foot pedal, whereas when used on pleasure cars, the holder, or retainer lies substantially parallel with the longitudinal axis of the accelerator pedal. However, it is possible to hold the floor engaging member holder, or retainer 12 in various positions under the accelerator pedal due to the screw connection with the clamp body portion 12.

A suitable screw 33 may be carried by the apertured ear 32 to serve as an adjusting device for tilting the holder, or retainer 12 relative to the accelerator pedal by raising, or lowering one end of the holder, or retainer 12 relative to the pedal.

From the foregoing description, it will be apparent that I have provided a simply constructed speed meter device for accelerator pedals to warn the driver through foot feel when a predetermined speed has been attained by a flexibly resilient member engaging, or contacting the floor of the automobile by foot pressure on the accelerator pedal and to slightly increase the speed by exerting greater than normal foot pressure on the accelerator pedal.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

What I claim is:

1. A motor vehicle accelerator pedal attachment comprising an inverted channel member U-shaped in cross-section, a flat horizontally disposed ear having an elongated opening projecting from one end of the channel member, a flat vertically disposed rubber member detachably carried by and projecting beyond the lower edges of the side walls of the channel member, a clamp member provided with oppositely directed flanges with one of the flanges having an opening therein, means for detachably connecting the clamp member to and upon the aforesaid ear, a second clamp member having an opening therein, and means for connecting the second clamp member with the clamp member flange having the opening therein.

2. An attachment as defined in claim 1, including a flat horizontally disposed ear having an elongated opening therein projecting laterally from the opposite end of the channel member and an adjusting screw carried by the last mentioned ear.

References Cited in the file of this patent
UNITED STATES PATENTS

| Number | Name | Date |
|---|---|---|
| 1,473,984 | Bailhe | Nov. 13, 1923 |
| 1,484,847 | Rivers | Feb. 26, 1924 |
| 2,332,064 | Duffy | Oct. 19, 1943 |
| 2,349,742 | Macavoy | May 23, 1944 |
| 2,352,136 | Ten Eyck | June 30, 1944 |
| 2,381,390 | Vanke | Aug. 7, 1945 |
| 2,518,056 | Olsen | Aug. 8, 1950 |